June 21, 1949.　　　　A. J. STOKES　　　　2,473,553
METHOD OF AND APPARATUS FOR MEASURING
THE FILM STRENGTH OF LIQUIDS
Filed Jan. 7, 1946
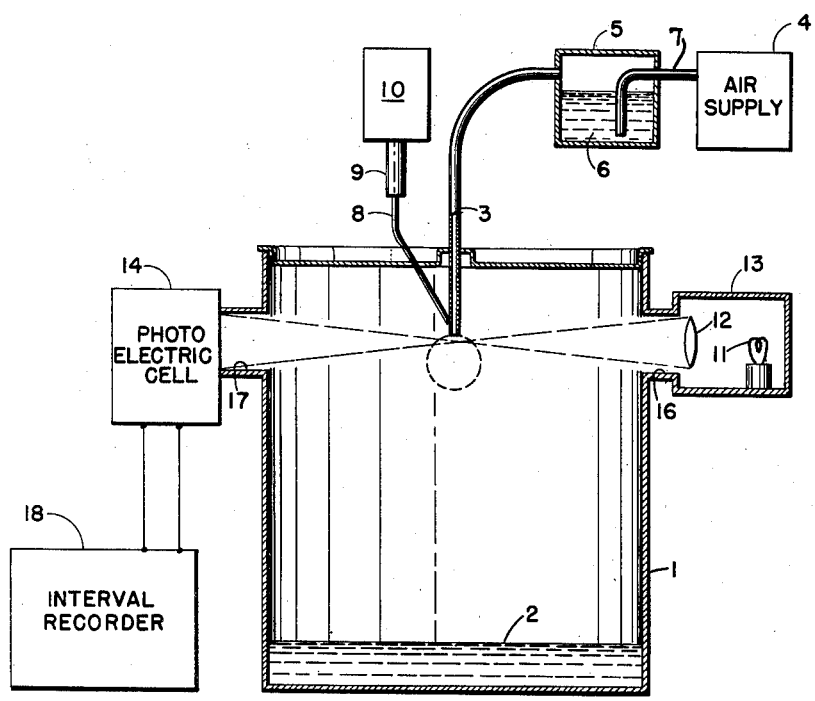
Inventor
ARTHUR J. STOKES
By
Attorney Patented June 21, 1949

2,473,553

UNITED STATES PATENT OFFICE 2,473,553

METHOD OF AND APPARATUS FOR MEASURING THE FILM STRENGTH OF LIQUIDS

Arthur J. Stokes, Washington, D. C.

Application January 7, 1946, Serial No. 639,679

5 Claims. (Cl. 73—53)

(Granted under the act of March 3, 1883, as amended April 30, 1928; 370 O. G. 757)

This invention relates to a method of and apparatus for measuring the film strength of a liquid.

In certain applications where foaming or bubble forming compounds are employed, it is desirable to ascertain the film strength of the liquid forming the foam. For example, where foam forming, fire extinguishing compounds are employed, in evaluating the characteristics of such compounds it is necessary to know the film strength of the bubble walls. Because of the evanescent character of most bubbles, determination of the characteristics of the bubbles is very difficult.

An object of the present invention is to provide an effective and efficient method of and apparatus for measuring the film strength of a liquid and more particularly, the film strength of a bubble forming liquid.

In accordance with one embodiment of this invention, air under a constant pressure is caused to flow from the end of a tube located in a tank and a predetermined amount of the liquid to be tested is applied to the end of the tube, the air flow then causing a bubble to be formed at the end of the tube. Appearance of the liquid at the end of the tube interrupts a light beam and this interruption is detected by a photoelectric cell, which actuates a suitable time recording device. Bursting of the bubble permits the beam to reach the photoelectric cell causing the recording device to be again actuated. The interval of time required for the bubble to form and to burst, as indicated by the recording device, is a measure of the size of the bubble. The film thickness at the bursting point may then be calculated from the amount of liquid used in blowing the bubble and its bursting size. The film thickness at the bursting point is utilized as an indication of the film strength of the liquid.

Other objects and advantages of the present invention will be apparent from the following detailed description taken in conjunction with the drawing wherein the single figure is a schematic illustration of an apparatus constructed in accordance with this invention for measuring the film strength of a liquid.

Referring now to the drawings, it will be seen that a closed tank 1 is provided in the lower portion of which is located a quantity of water 2 sufficient to maintain a substantially saturated, moist atmosphere in the tank. It will be readily apparent that because of the large surface area presented by a liquid being tested when formed into a bubble, evaporation would occur very rapidly under conditions of normal humidity. This would seriously affect the accuracy of the results obtained from the test since the actual final amount of liquid present at the bursting of the bubble would then be substantially less than the initial amount used. By providing the water 2, a moist atmosphere is maintained in the tank so that substantially no drying or evaporation of the liquid under test occurs during the bubble blowing.

The lower portion of a tube 3 extends downwardly through the upper wall of the tank, the lower end of the tube 3 being located substantially in the center of the upper portion of the tank and being substantially vertically disposed so that as the liquid to be tested is applied to the tube, it will run down and over the end of the tube. At its upper end the tube may be connected to a suitable air supply 4 whereby air at a constant pressure may be supplied to the tube so that a constant rate of air flow from the end of the tube is maintained. As it is desirable that the air supplied to the tube 3 be maintained in as moist a condition as possible, a humidifier chamber may be located intermediate the air supply 4 and the portion of the tube 3 connected to the tank 1. Such devices are well known to the art, and may comprise a small tank 5, as shown, wherein the air enters the tank below the surface of the water 6, located therein from an inlet pipe 7 connected to the air supply and leaves the tank from a suitable outlet located above the level of the water. The air in bubbling through the water is humidified. The purpose of providing moisture in the air supply to the tube 3 is the same as that for which the moist atmosphere is maintained in the tank 1, that is, to prevent evaporation of the liquid under test.

In order to apply a measured quantity of the liquid to be tested to the tube 3, the lower end of a second tube 8 extends through the upper wall of the tank 1 and is located immediately adjacent the lower end of the tube 3. The tube 8 is connected at its upper end to the base of a micrometer syringe 9 in which may be placed a quantity of the liquid to be tested. The block 10 represents a mechanism for actuating the syringe whereby a predetermined amount of the liquid in the syringe may be expelled from the syringe upon each actuation of the mechanism. Upon each actuation of the syringe a small quantity of the liquid being tested is applied to the lower end of the tube 3 from the tube 8, the quantity of the liquid being thus precisely predetermined. Any suitable actuating mechanism may be employed and it may be designed to operate manually or automatically as may be desired; however, because it is desirable to make a fairly large number of tests with the liquid being examined in order to obtain an average, it is preferable that the syringe actuating mechanism operate automatically.

In order to measure the time interval elapsing between the formation of a bubble at the lower end of the tube 3 and the bursting of the bubble, a light source 11 having a lens 12 associated therewith is mounted on one side of the tank in a small housing 13, while a photoelectric cell is mounted on opposite side thereof, the cell being designated by the block 14. Suitable ports 16 and 17, respectively, are formed through the side walls of the tank 1, as shown, to permit the beam of light from the light source to reach the photoelectric cell. The positions of the light source and the photoelectric cell with respect to each other and to the lower end of the tube 3 are selected so that the lens 12 causes the rays of light from the light source to converge substantially at a point immediately below the lower end of the tube 3. Consequently, as soon as a drop of liquid appears at the lower end of the tube, the light beam will be interrupted or impeded. Connected to the photoelectric cell and operable in response to the cell being energized or deenergized is a suitable interval recording device indicated by the block 18, whereby when the beam of light is interrupted and the photoelectric cell is deenergized, one indication will be recorded and thereafter when the beam of light is no longer interrupted, a second recording will be made, providing thereby a measure of the interval of time elapsing between the two occurrences. Such an interval recording device may comprise a drum rotating at a constant speed and having associated therewith a pen which is caused to mark the drum in response to a signal. Knowing the rate of rotation of the drum, it is then a simple matter to compute the interval indicated by the spacing between any two marks. Many types of interval recording devices are available and any suitable interval recording device may be employed.

In the operation of this apparatus in accordance with the present invention, a mesured quantity of the fluid to be tested is applied to the outer portion of the lower end of the tube 3 from the syringe 9 while air at a constant rate of flow is passing from the lower end of the tube 3. The quantity of liquid to be employed in a particular case depends on the diameter of the orifice at the lower end of the tube and the wetting ability of the liquid; a sufficient amount of liquid must be employed so that the liquid will flow completely around the end of the tube, in effect capping the end, and yet not so much liquid may be employed that the liquid by virtue of its own weight will run off the end of the tube. For example, in testing a protein solution it was found feasible to apply approximately 50 mg. of the protein solution to a tube having an orifice one millimeter in diameter. The quantity of light to be used is not critical and large variations are feasible.

The rate of flow of the air from the lower end of the tube 3 must be adjusted so that it is not so great as to blow the liquid away from the end of the tube or to cause so rapid an enlargement of the bubble as to produce premature bursting. Since the atmosphere in which the bubble is formed and the current of air forming the bubbles are both maintained in a substantially saturated moist condition, thus preventing evaporation of the liquid, it is possible to form the bubble very slowly, that is, for example, to form a single bubble over a period of as long as an hour or more. In practice, it has been found that a minimum blowing time on the order of one minute is sufficiently long so that bursting of the bubble due to the rapidity of enlargement thereof rather than to the bubble wall being stretched beyond its bursting point is avoided. Referring to the example hereinbefore given wherein a tube having an orifice size of one millimeter and a quantity of liquid on the order of 50 mg. is applied thereto, a practical rate of flow has been found to be 150 cubic centimeters per minute. This rate of flow, however, is not critical and may be increased within the limits indicated, or decreased substantially without materially affecting the accuracy of the results.

Since the beam of light from the light source 11 is focused on the lower end of the tube 3, the appearance of a drop of liquid at the end of the tube will cause an interruption of the beam, thereby deenergizing the photoelectric cell and causing the interval recording device to be actuated. It will be apparent that while the liquid being tested may be translucent, the rays of light in passing through the drop or the bubble will be refracted and consequently reduced in intensity, thus reducing the value of the light falling on the photoelectric cell. By adjusting the sensitivity threshold of the photoelectric cell and associated interval recording device, the reduction in light value produced by the drop and later the bubble may be made sufficient to actuate the recording device in response to a very slight change in the value of the light falling on a photoelectric cell, such as might be the case where a substantially clear liquid is being tested. Since, as the liquid being tested flows around the end of the tube closing the end of the tube, air is flowing from the end of the tube 3, a bubble will begin to form immediately. The bubble will increase in size at a rate determined by the rate of flow of the air from the end of the tube, and will continue to increase in size until the film strength of the liquid has been exceeded. At this time the bubble will burst. Bursting of the bubble permits the beam of light from the light source to reach the photoelectric cell 14 unimpeded and this energizes the cell, thus actuating the interval recording device. This produces a second record and provides thereby a measure of time required for the bubble to form and then to burst.

Since a constant air flow rate is maintained during the formation of the bubble, the size of the bubble will be substantially equivalent to the amount of air in the bubble, there being substantially no compression of the air within the bubble. The amount of air in the bubble may be readily determined from the interval of time during which the bubble was blown and from the rate of flow of the air blowing the bubble. For example, assuming a rate of flow of 150 cc. per minute over a period of two minutes, a bubble having a volumetric size of 300 cc. would be blown. It has been determined experimentally that the bubble formed by the apparatus of this invention will be substantially spherical in shape. Thus, knowing the volume of the bubble, it is then possible in accordance with well known formula to calculate the surface area of the bubble. The film thickness at the bursting point is then equivalent to the volume of the liquid in the drop applied to the end of the tube 3, divided by the surface area of the bubble at the instant of bursting. In accordance with this invention, the film thickness at the bursting point is utilized as a measure of the film strength of the liquid being tested.

From the foregoing it will be apparent that in accordance with this invention, a method and apparatus have been provided whereby the film thickness at the bursting point of a liquid may be readily determined and since the film thickness at the bursting point is a direct indication of the film strength of the liquid, consequently the minimum film thickness may be employed as a measure of the film strength in comparing liquids. For any given apparatus operating under a constant set of conditions it is feasible and accurate to compare the film strengths of various liquids by comparing the intervals of time required for bubbles formed therefrom to reach bursting size. Where tests are made in several apparatus, it is necessary to calculate the actual film thickness at the bursting point of the bubble in order to measure film strength or to compare liquids.

While but one embodiment of this invention has been shown and described, it will be understood that many changes and modifications may be made therein without departing from the spirit or scope of the present invention.

The invention shown and described herein may be manufactured and used by or for the Government of the United States of America for governmental purposes without the payment of any royalties thereon or therefor.

What is claimed is:

1. A method of measuring the film strength of a liquid including forming a bubble from a known quantity of the liquid being tested and increasing the size of the bubble at a predetermined rate to the bursting point, and measuring the time required for formation and bursting of the bubble, as an indication of the film strength.

2. An apparatus for measuring the film strength of a liquid including a tank, a quantity of liquid in said tank to maintain a substantially moisture saturated atmosphere in said tank, a tube having its lower end extending into said tank, a source of air connected to said tube for maintaining a constant flow of air from said tube, means adjacent said tube for applying a measured quantity of the liquid to be tested to the end of said tube disposed in said tank, a light source, a light sensitive device, said light source and said light sensitive device being so disposed with respect to each other and the lower end of said tube that at least a portion of the illumination from said light source is directed toward said light sensitive device through a point immediately below the lower end of said tube, and means controlled by said light sensitive device operable in response to changes in energization of said light sensitive device to record the time of occurrence of such changes.

3. In an apparatus for measuring the film strength of a liquid, means for forming a bubble from a measured quantity of the liquid being tested and for increasing the size of the bubble to the bursting point, a light source adjacent said bubble forming means, a light sensitive device adjacent said bubble forming means and spaced from said light source so that the light from said source normally reaching said light sensitive device will be at least partially reduced in value upon the formation of a bubble and then will return to its normal value upon the bursting of the bubble, and means controlled by said light sensitive device for measuring the time interval between formation and bursting of said bubble.

4. In an apparatus for measuring the film strength of a liquid, means for forming a bubble from a measured quantity of the liquid being tested and for increasing the size of said bubble to the bursting point at a predetermined rate, and means associated with said bubble forming means and operable in response to the formation of a bubble and the later bursting of a bubble to measure the time interval between the formation and bursting of the bubble.

5. In an apparatus for measuring the film strength of a liquid, a container, means for maintaining a moist atmosphere in said container, means for forming a bubble from a predetermined quantity of the liquid being tested within said container and for increasing the size of the bubble to the bursting point at a predetermined rate, and means operable in response to the formation of a bubble and to the bursting of a bubble for measuring the time interval between these occurrences.

ARTHUR J. STOKES.

No references cited.